(12) United States Patent
Putkonen et al.

(10) Patent No.: US 9,880,559 B2
(45) Date of Patent: Jan. 30, 2018

(54) METHOD AND ARRANGEMENT FOR MONITORING THE COLLECTION OF PLANT MATERIAL

(71) Applicant: Deere & Company, Moline, IL (US)

(72) Inventors: Aki Juha Antero Putkonen, Tampere (FI); Johannes Kaarnametsä, Pirkkala (FI); Vesa Siltanen, Tampere (FI)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/263,776

(22) Filed: Sep. 13, 2016

(65) Prior Publication Data
US 2017/0075354 A1    Mar. 16, 2017

(30) Foreign Application Priority Data

Sep. 14, 2015   (EP) .................................... 15185018

(51) Int. Cl.
*A01G 23/00* (2006.01)
*G01C 21/20* (2006.01)
(Continued)

(52) U.S. Cl.
CPC ......... *G05D 1/0219* (2013.01); *A01G 23/003* (2013.01); *A01G 23/006* (2013.01);
(Continued)

(58) Field of Classification Search
CPC .... A01G 23/003; A01G 23/006; A01G 23/08; G01C 21/20; G05D 1/0219; G06F 17/30241; G06Q 50/02
(Continued)

(56) References Cited

U.S. PATENT DOCUMENTS 8,407,157 B2*  3/2013  Anderson ............ A01B 69/008
                                            701/50
9,113,590 B2*  8/2015  Johnson ............... A01B 79/005
                      (Continued)

FOREIGN PATENT DOCUMENTS

EP        1902611       3/2008
WO     2012069698       5/2012
                     (Continued)

OTHER PUBLICATIONS

EP3141108 Extended European Search Report dated Feb. 19, 2016 (3 pages).
(Continued)

*Primary Examiner* — Tyler J Lee
(74) *Attorney, Agent, or Firm* — Michael Best & Friedrich LLP (57) ABSTRACT

A method of and arrangement for monitoring the collection of plant material includes the following steps and apparatus for executing these steps, respectively: collecting plant location and attribute data with respect to plant material, before and/or during and/or after harvesting the plant material, providing the plant location and attribute data on a collecting vehicle adapted to collect the harvested plant material, moving the collecting vehicle to the harvested plant material based on the plant location data, collecting the harvested plant material, sensing attribute data of the harvested plant material before and/or during and/or after the collecting, and comparing the sensed attribute data with the plant attribute data and generating an output dependent on the result of the comparison.

20 Claims, 6 Drawing Sheets

(51) Int. Cl.
G05D 1/02 (2006.01)
G06Q 50/02 (2012.01)
G06F 17/30 (2006.01)
A01G 23/08 (2006.01)

(52) U.S. Cl.
CPC ....... *G01C 21/20* (2013.01); *G06F 17/30241* (2013.01); *G06Q 50/02* (2013.01); *A01G 23/08* (2013.01)

(58) Field of Classification Search
USPC .......................................................... 701/50
See application file for complete search history.

(56) References Cited

U.S. PATENT DOCUMENTS

| 9,489,576 B2* | 11/2016 | Johnson | G06K 9/00657 |
| 2004/0112466 A1 | 6/2004 | Roth et al. | |
| 2006/0096667 A1 | 5/2006 | Stevens et al. | |
| 2010/0250482 A1* | 9/2010 | Ma | A01G 23/00 706/54 |
| 2015/0278640 A1* | 10/2015 | Johnson | G06K 9/00657 382/110 |

FOREIGN PATENT DOCUMENTS

| WO | 2014118430 | 8/2014 |
| WO | 2014122364 | 8/2014 |

OTHER PUBLICATIONS

Flisberg et al., "Optimization based planning tools for routing of forwarders at harvest areas," Can. J. For. Res. (2007) vol. 37, pp. 2153-2163.

John Deere, "Steuersysteme fur Forstmaschinen," der E-Serie, Apr. 2011 (13 pages, which included a Statement of Relevance).

* cited by examiner

METHOD AND ARRANGEMENT FOR MONITORING THE COLLECTION OF PLANT MATERIAL

CROSS-REFERENCE TO RELATED APPLICATIONS

This application claims priority under 35 U.S.C. § 119 to European Patent Application EP 15185018.7, filed Sep. 14, 2015, and titled "METHOD AND ARRANGEMENT FOR MONITORING THE COLLECTION OF PLANT MATERIAL," the content of which is hereby incorporated by reference in its entirety.

FIELD

The present disclosure pertains to a method and arrangement for monitoring the collection of plant material.

BACKGROUND

In forestry, trees growing in a forest are in many cases felled, delimbed and also cut to a desired length or into logs into with a so-called harvester, which is a self-propelled vehicle. The logs remain on the worksite, either on the position where they have been ejected by the harvester head during cutting or are deposited on one or more piles, which are optionally sorted according to defined parameters like intended use of the logs, and are collected subsequently with a so-called forwarder. The forwarder is also self-propelled and has an arm for grabbing one or more logs at a time and a loading space into which the collected logs are deposited. Once the loading space is sufficiently filled, the forwarder drives to a location adjacent a road and deposits the logs on a single or multiple piles, in particular sorted according to the intended use of the logs, from which they are later collected by trucks and transported to the next processing stage (saw mill, paper factory, etc.).

Recently, some electronic assistance has been proposed for the operator of the harvester and the forwarder. For example, according to U.S. Pat. No. 8,407,157 B2, the harvester can collect data about the location of the harvester when felling and processing trees, which is assumed to be located close to the location of the logs, together with material identifier data collected by a sensor to identify the type of the wood and data on the dimensions and weight. These data can be wirelessly transmitted to the forwarder. The forwarder can thus plan an optimal path to the logs in the forest and to the deposition location at the road, and be manually or automatically guided along the planned path. In another embodiment, the mentioned data are physically referenced on the logs, e.g., by RFID tag or a barcode, and read by the forwarder once sufficiently close to the logs. Similar path planning systems are described in WO 2014/122364 A1 and P. Flisberg et al., "Optimization Based Planning Tools for Routing of Forwarders at Harvest Areas," Can. J. For. Res. 37:2153-2163 (2007).

WO 2012/069698 A1 proposes to send data about the harvested trees, which can be collected among others by means of a camera, to a central server, allowing a user to remotely check the felling operation in the forest.

The forwarder can be provided with a scale integrated into its arm, in order to sense the weight of the logs loaded into the loading space. The weight data can thus be recorded, together with additional data regarding the logs, in particular their number. Such information can, like corresponding information on the felled trees, be wirelessly sent to the forest owner (cf. for example brochure "Steuersysteme für Forstmaschinen der E-Serie, John Deere, print remark 4-2011). The number of the collected logs needs presently to be manually input by the operator.

EP 1 902 611 A2 describes an agricultural harvesting system sensing parameters of crop during harvesting and storing this material in a container with a traceability device, like a RDID chip or barcode. Information on the location of the container and its traceability device is stored on the harvester for later accession of the container with the crop.

U.S. Pat. No. 6,772,546 B2, also discussed in US 2006/0096667 A1, describes a transponder chip to be fixed to a log. An operator is equipped with a portable transmit and receive unit and writes data regarding the log onto the chip. When the logs are collected and loaded on a transport vehicle, the data of all chips can be read to provide a loading list of the vehicle, which is read at the factory gate receiving the logs and compared there with an announced list.

SUMMARY

Collection of the logs takes place in an environment that is not always easy to oversee for the operator of the forwarder, since the logs may lie distributed over the ground between smaller plants like shrubs or in water puddles or small ponds, under snow or in invisible areas at night. It is thus possible that some logs are not collected, but overseen and thus remain forgotten in the forest. Also, manual input of the collected logs is not always entirely accurate, since the forwarder operator can forget this input or by accident input more or less logs than actually collected. Further on, additional errors can occur, like collection of logs in a different forest as intended, errors during data collection at the tree harvester, and logs can be stolen. Similar problems can also occur when agricultural material, like baled grass or straw or other crop, is left on a field and later collected. The mentioned prior art is not capable of recovering such errors. All this affects the working time, fuel consumption, operator stress, communication, tracks and ground compaction in the forest and thus overall reduces the productivity of the forest site.

Thus, there is a need for an improved method and arrangement for collecting harvested material.

A method of and an arrangement for monitoring the collection of plant material comprises the following steps and means for executing these steps, respectively: on a worksite, collecting plant location and attribute data suited for a later identification of the respective plant material, before and/or during and/or after harvesting the plant material on the worksite; providing the plant location and attribute data on a collecting vehicle adapted to collect the harvested plant material; moving the collecting vehicle to the harvested plant material on the worksite, based on the plant location data; collecting the harvested plant material in a loading space of the collecting vehicle; sensing attribute data of the harvested plant material before and/or during the collecting; comparing the sensed attribute data with the plant attribute data and generating an output dependent on the result of the comparison, and presenting the result of the comparison to an operator of the collecting vehicle via a user interface including displaying an error message if the comparison reveals that the stored plant attribute data and the sensed plant attribute data do not match.

In other words, plant location and attribute data are collected before, during or after harvesting (preferably within a chronological context with the harvesting step), in order to determine the location of the plant material (which is subsequently to be collected by means of a collecting vehicle), and at the same time or separately therefrom (preferably also within a chronological context with the harvesting step), attribute data for the plant material are collected or sensed. These attribute data can be manually input and/or selected by the operator of the harvester and/or sensed by an appropriate sensor and/or be based on previously stored information, like an electronic map indicating position and/or size of the plants or trees. These attribute data are suited for a later identification of the respective plant material. Both plant location and attribute data are transferred to the collecting vehicle. The collecting vehicle is automatically or manually guided to the harvested plant material, based upon the plant location data (and possibly upon other control data, like attributes of the plant material to be collected if the collection vehicle just has to collect plant material with one or more predefined attribute, but no other plant material) and collects the harvested plant material there. Before or during collecting the plant material (preferably within a chronological context with the collecting step), attribute data are sensed. This can be performed by manually input or selection by the operator of the collecting vehicle and/or by sensing by an appropriate sensor. The now input or sensed attribute data are compared with the known plant attribute data. The result of the comparison is outputted. The result of the comparison can be presented to an operator of the collecting vehicle via a user interface and optionally wirelessly submitted to a remote location or server.

In this way, the problems mentioned above can be avoided or at least reduced, since the output will indicate when an attribute of the collected plant material does not confirm to an expected plant attribute, thus indicating that an error has occurred. The location and attribute data can be included into a database representing the inventory of the site after harvesting. The operation (decisions/planning/optimizations/movements) of the collecting vehicle can be controlled using this database, which can also be updated during the collection and thus always be kept up to date. If several collecting vehicles are working at the same time on a work site, they can use jointly the same database and update it in real time, such that all information used is always actual and correct.

Such an attribute can be the number, size, weight, color, type, ingredients of the plant material and identification data of an electronically or optically readable marker provided during harvesting on the plant material and/or a container thereof. For example, if the number of collected plants (e.g., logs) is less than the expected number indicated by the plant attribute data, the output can indicate this fact and preferably also the difference. The operator of the collecting vehicle can thus search for missing logs or, if he or she does not find them, report stolen logs to the forest owner or to the police. On the other hand, if more logs are collected than expected, this can be an indication that the collecting vehicle is not collecting at the correct location or that an error has occurred on the harvester. Thus, such errors can be corrected. At the end of the collection operation, correct figures on the collected plant material can be reported to the forest owner. In addition, collected plant material and quantities (all attribute data) can be cross-checked against attributes that were collected during harvesting and/or data collected during an unloading/deposit phase in which the plant material is loaded off the collecting vehicle and thus errors can be indicated and corrected.

The attribute data can concern one plant or a plurality of plants or one part of one plant or parts of one plant or parts of a plurality of plants. In the context of tree harvesting, the attribute data can thus concern one entire tree, parts (i.e. one log) of one entire tree, a number of trees or parts (i.e. logs) of a number of trees. An attribute can hence be separately assigned to each tree or to each log, or one attribute is used for a number of logs from one tree or from a number of trees.

In one embodiment, the plant material is wood and the collecting vehicle is a self-propelled forwarder with a loading arm for grabbing one or more logs at a time and a loading space into which the collected logs are deposited. In another embodiment, the plant material is agricultural material like grass, straw, cotton or grain and the collecting vehicle is a vehicle for collecting the plant material that has been baled or filled in a container by a harvesting machine, which might be a (cotton or straw) baler or a combine.

The plant location and/or attribute data can be transmitted to the collecting vehicle by means of a wireless data transmission or a physical data carrier like a memory chip.

The plant data collection device or assembly can be provided on a harvesting vehicle and/or on a separate vehicle like a robot or drone or carried by a person. Analogously, the sensor for sensing the attribute can be provided on the collecting vehicle and/or on a separate vehicle like a robot or drone or carried by a person.

In one embodiment, a method of monitoring the collection of a plant material includes, on a worksite, collecting plant location and attribute data suited for a later identification of the respective plant material, before, during, and/or after harvesting the plant material on the worksite, providing the plant location and the attribute data to a collecting vehicle configured to collect the harvested plant material, moving the collecting vehicle to the harvested plant material on the worksite, based on the plant location data, collecting the harvested plant material in a loading space of the collecting vehicle, sensing attribute data of the harvested plant material before and/or during the collecting, comparing the sensed attribute data with the plant attribute data and generating an output dependent on the result of the comparison, and presenting the result of the comparison to an operator of the collecting vehicle via a user interface including displaying an error message if the comparison reveals that the stored plant attribute data and the sensed plant attribute data do not match.

In another embodiment, an arrangement for monitoring the collection of plant material includes a plant data collection assembly configured to collect plant location and attribute data suited for a later identification of the respective plant material before, during, and/or after harvesting the plant material on a worksite, and a data transfer device configured to transfer the plant location and attribute data to a collecting vehicle that is configured to move to the harvested plant material on the worksite based on the plant location data and to collect the harvested plant material in a loading space of the collecting vehicle. At least one sensor is configured to sense attribute data of the harvested plant material before and/or during the collecting, a data processor is configured to compare the sensed attribute data with the plant attribute data and to generate an output dependent on the result of the comparison, and a user interface is configured to present the result of the comparison to an operator of the collecting vehicle and to display an error message if the comparison reveals that the stored plant attribute data and the sensed plant attribute data do not match.

Other aspects of the disclosure will become apparent by consideration of the detailed description and accompanying drawings

DETAILED DESCRIPTION

Figure 1:
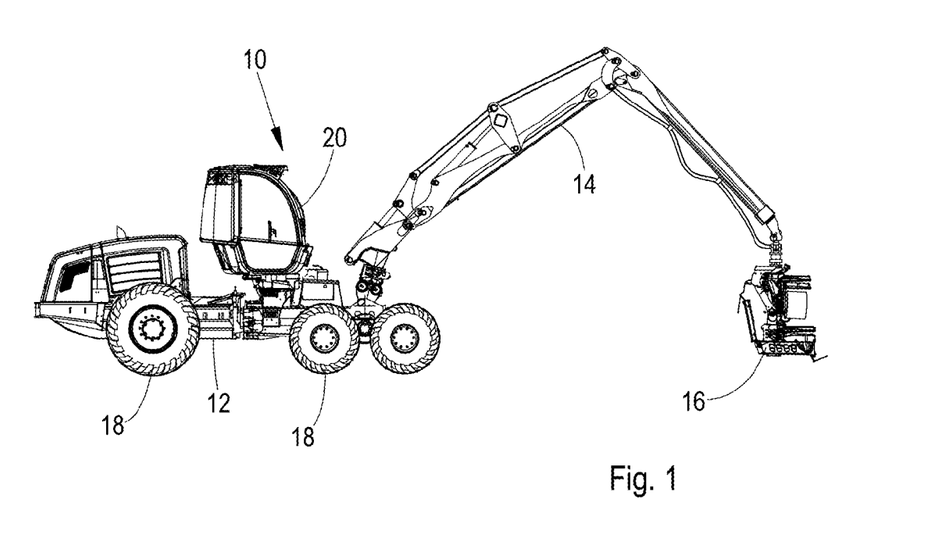
FIG. 1 shows a side view of a tree harvester.

FIG. 1 shows a side view of a forestry harvester 10. The harvester 10 comprises a frame 12 supported on wheels 18. The frame supports an operator station 20 and a boom 14 with a harvester head 16 on its outer end. During operation, an operator sitting in the operator station 20 drives the harvester 10 into a forest and controls the harvester head 16 to grab a tree, cut the tree off the ground, to lay the tree down in a controlled manner, to delimb it and to cut it into logs of desired length. In other embodiments, delimbing and/or cutting can performed manually or by separate, suitable machines.

Figure 2:
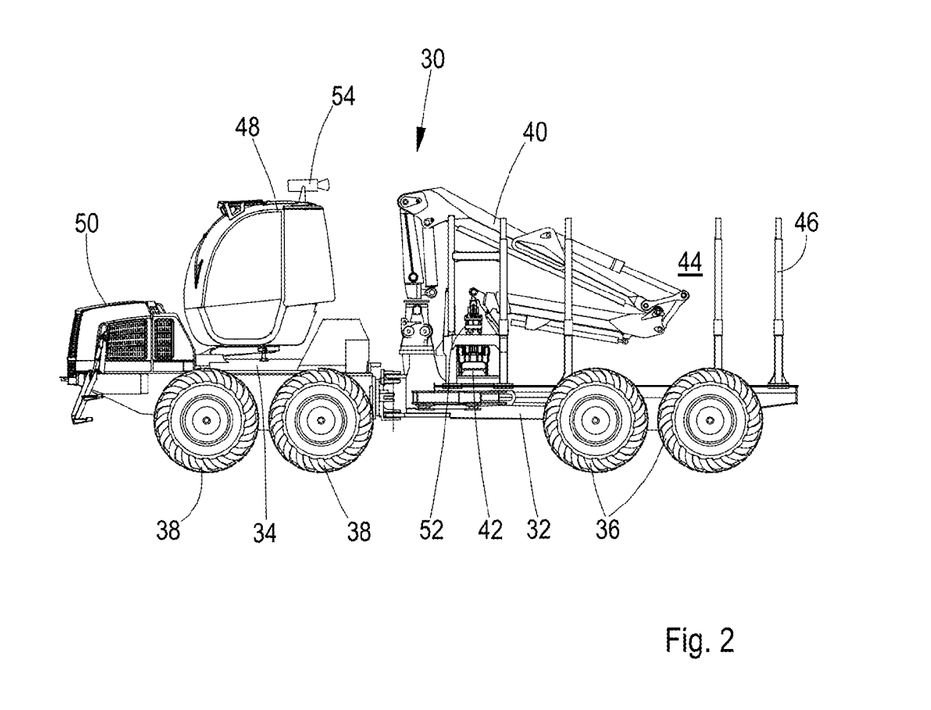
FIG. 2 shows a side view of a forwarder.

In FIG. 2, a forwarder 30 is shown. The forwarder 30 comprises an articulated frame with a first part 32 and a second part 34, both supported on wheels 36, 38, respectively. The first part 34 supports an arm 40 having a grabber 42 on its outer end. The arm 40 with the grabber 42 is shown in a stowed position in which they are located in a loading space 44 surrounded by posts 46. The second part 34 of the frame supports an operator station 48 and an engine compartment 50. During operation, an operator sitting in the operator station drives the forwarder 30 sufficiently close to logs to be collected (during normal driving on roads and in the forest, the operator station 48 is rotated by 180° around the vertical axis, compared with the operation position shown in FIG. 2, such that the forwarder 30 then drives to the left side in FIG. 2) and controls the arm 40 and the grabber 42 to take up one or more logs at a time and to deposit them into the loading space 44. Once the loading space 44 is sufficiently filled, the forwarder 30 is driven to another place, generally close to a road, where it deposits the logs that are finally collected with a truck and brought to the next processing stage. A scale 52 is provided between the grabber 42 and the arm 40 to weigh the collected logs. Instead of or additional to sensing the load of the arm 40 with the scale 52, it would be possible to sense the load in the loading space 44 with a scale (not shown) between frame 32 and the bottom of the loading space 44, and thus to sense the weight increments when logs are loaded into the loading space 44. The scaling equipment can be located anywhere in or outside the forwarder 30, its arm 40, grabber 42 and/or its hydraulics.

Figure 3:
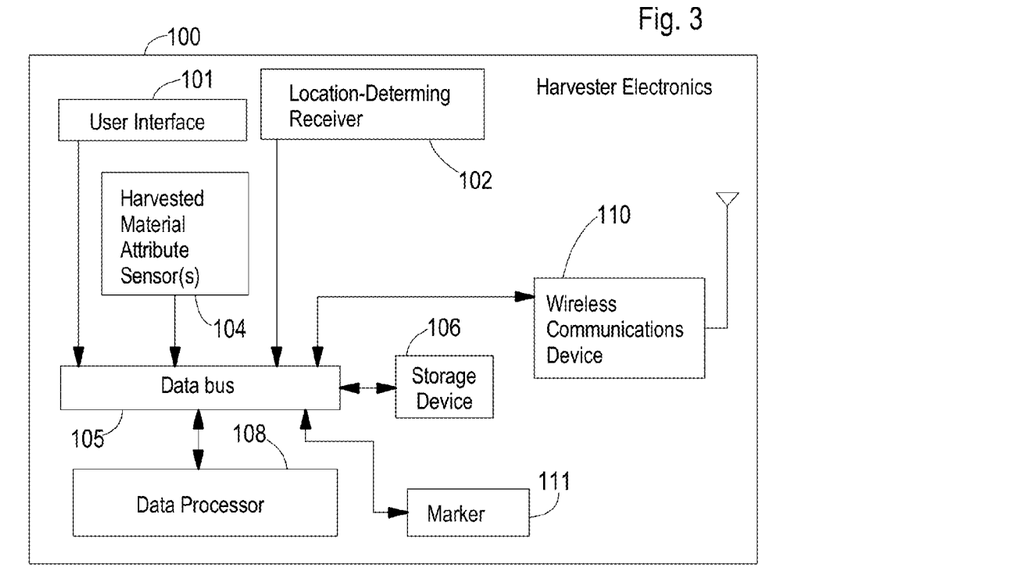
FIG. 3 shows a schematic diagram of the harvester electronics.

FIG. 3 shows a schematical diagram indicating some parts of the electronics 100 of the harvester 10. The harvester electronics 100 comprises a data processor 108 that is connected via a bus 105 to a user interface 101, a location determining receiver 102 receiving GNSS signals from a global positioning system like GPS, Glonass and/or Galileo, a storage device 106 (memory), one or more sensor(s) 104 for collecting one or more harvested material attributes, a marker 111 and to a wireless communications device 110.

Figure 4:
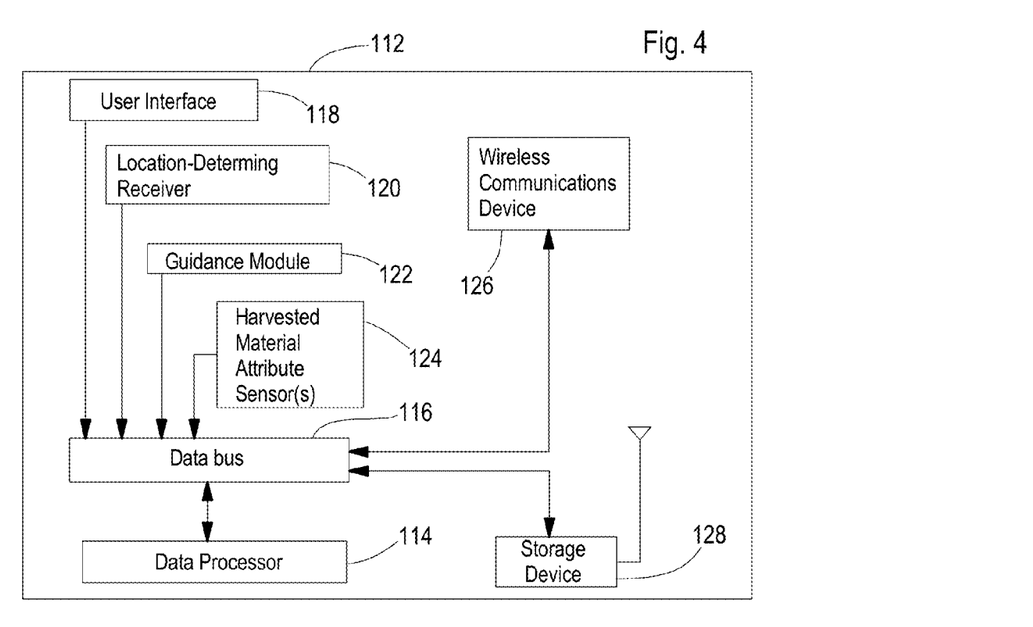
FIG. 4 shows a schematic diagram of the forwarder electronics.

FIG. 4 shows a schematical diagram indicating some parts of the electronics 112 of the forwarder 30. The forwarder electronics 112 comprises a data processor 114 that is connected via a bus 116 to a user interface 118, a location determining receiver 120 receiving GNSS signals from a global positioning system like GPS, Glonass and/or Galileo, a guidance module 122, a storage device 128 (memory), one or more sensor(s) 124 for collecting one or more harvested material attributes and to a wireless communications device 126.

Figure 5:
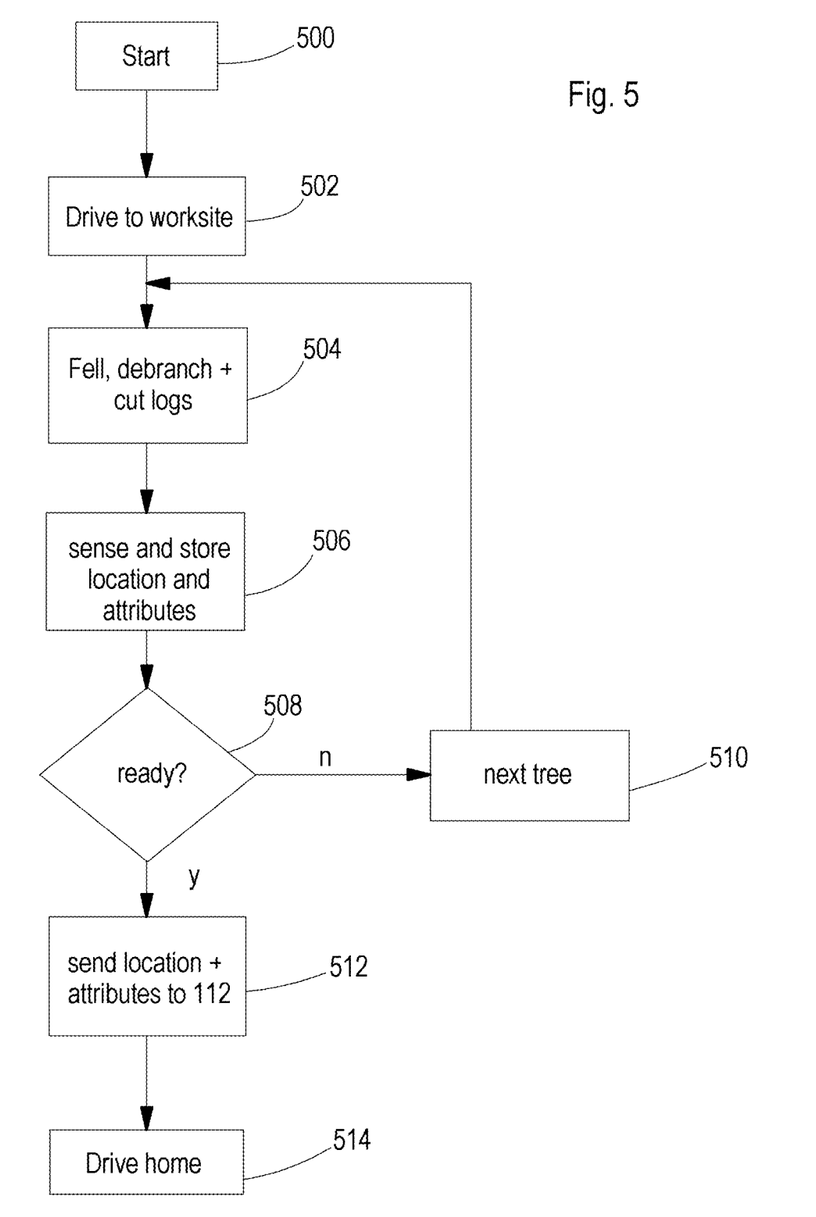
FIG. 5 shows a flow diagram associated with the operation of the harvester during tree harvesting.

FIG. 5 shows a flow diagram regarding the operation of the harvester 10 during tree harvesting. After start in step 500, the harvester 10 is driven by its operator to a worksite in a forest (step 502). In step 504, a tree is felled, delimbed and cut into logs of desired size. In step 506, the location of the harvester 10 (which is sufficiently close to the logs to find them afterwards) and/or the location of its boom 14 and/or the orientation of the boom 14 (which allows to estimate the location of the logs sufficiently exact) is stored, based on the location determined by the location-determining receiver 102, in the storage device 106 (which can be within a machine data or controller box), together with attribute data sensed by the harvested material attribute sensor 104. Such attribute data can concern the number of the logs, their size (diameter and/or length), weight, color (sensed by means of an optical sensor like a camera with an image processing system), type (indicating the species of the tree, like oak or pine etc., identified also for example by a camera with an image processing system) and/or ingredients (like cellulose and/or fiber content, which can be sensed with a NIR sensor). The material attribute sensor 104 thus detects one or more properties of the tree that can be helpful for later identification of the tree or logs resulting therefrom. The data processor 108, the storage device 106 and the material attribute sensor 104 act as a plant data collection device or assembly.

Additionally to or instead of recording the mentioned, sensed attribute data in the storage device 106, the data processor 108 can generate unique identification data, like a number, and write it onto a marker 111 that is fixed to a log, or read pre-stored data from a marker 111 of a supply of markers 111 and fix the marker to the log. The marker 111 can operate electronically, like a RFID chip, or be an optical marker, like a barcode. These identification data are also stored in the storage device 106.

After step 506, step 508 follows in which the harvester operator is prompted via the user interface 101 to input whether all trees to be felled have been felled or/and the entire harvest area has been covered. If the response is no, in which the harvester 10 drives, if necessary, to the next tree, and step 504 follows again. Otherwise, step 512 is executed, in which the collected plant location and attribute data from storage device 106 are sent, via the wireless communications device 110, to the wireless communications device 126 on the forwarder 30 and stored in the forwarder electronics 112 in storage device 128. Finally, the harvester 10 drives back to its home base (step 514).

Figure 6:
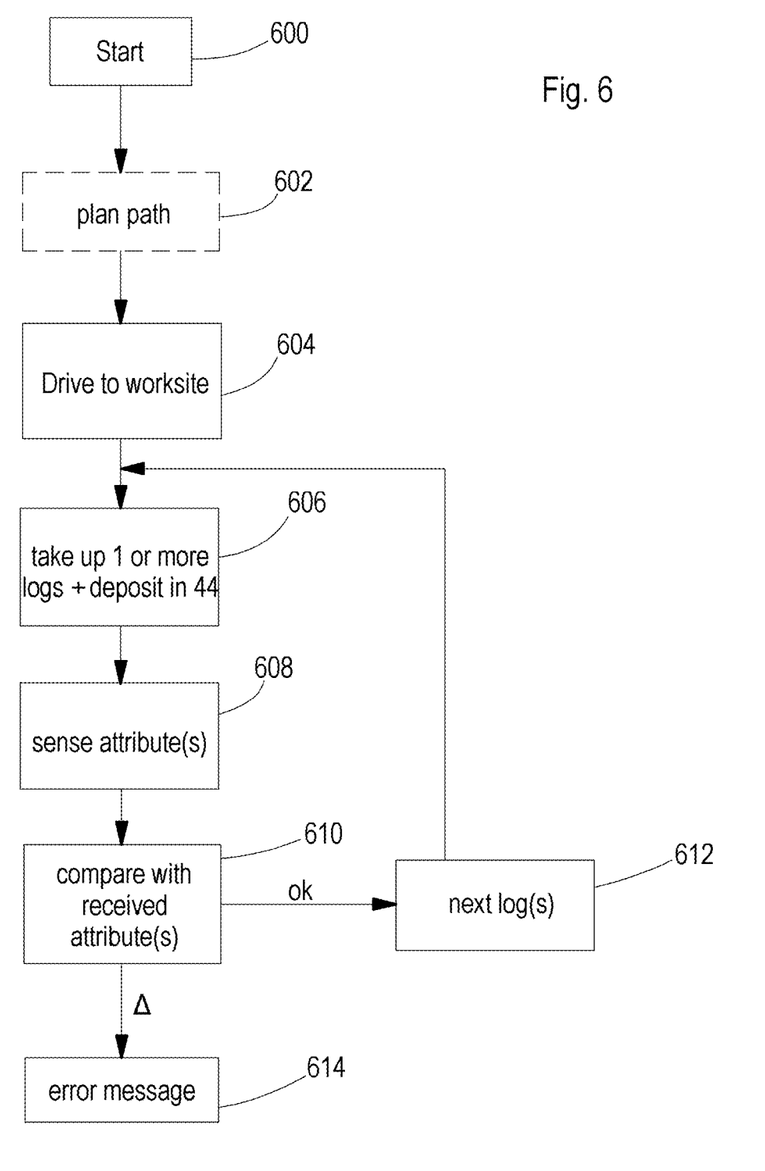
FIG. 6 shows a flow diagram associated with the operation of the forwarder during log collection.
Figure 7:
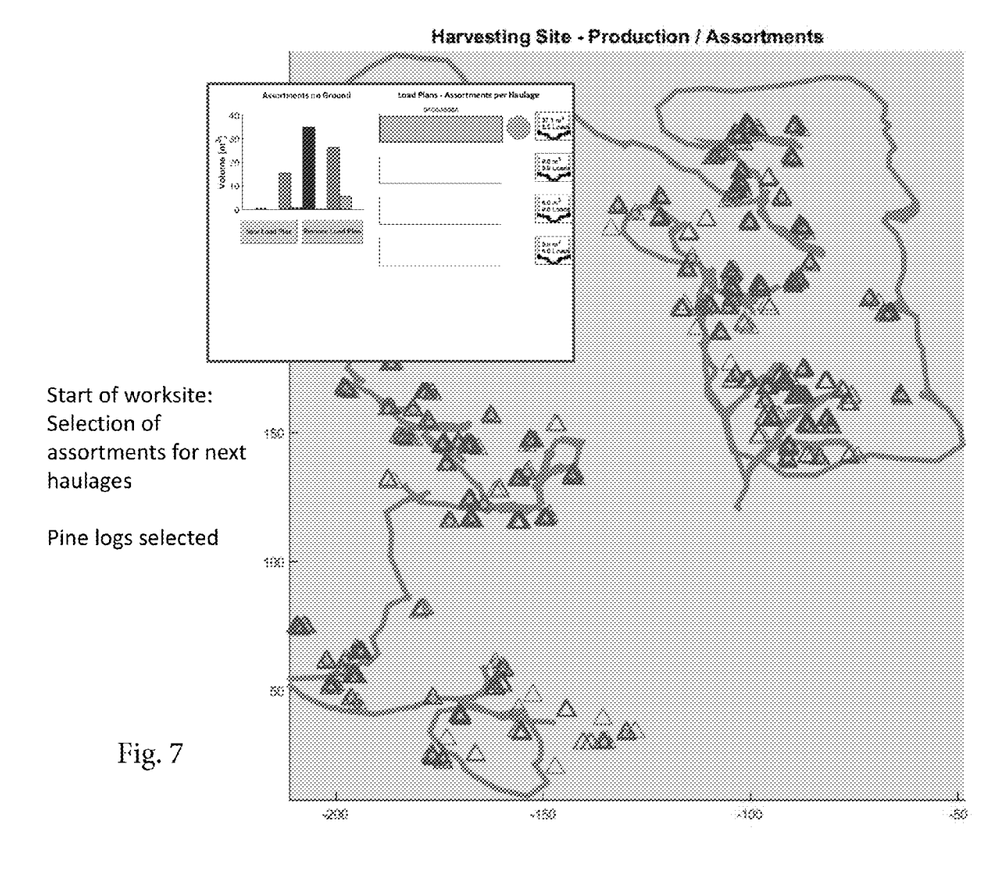
FIG. 7 shows a screen display available to the forwarder operator before collection logs.

FIG. 6 shows a flow diagram indicating the operation of the forwarder 30 when collecting the logs that have been harvested according to the diagram of FIG. 5. After start in step 600, in optional step 602 a work plan (which can be a path plan, selection of plant material with specific attribute data, cost plan, time plan, optimization of different aspects) for the forwarder 30 can be generated, as described in U.S. Pat. No. 8,407,157 B2, and subsequently displayed to the operator via user interface 118, as shown in FIG. 7. In the following step 604, the forwarder 30 is driven to the worksite where the logs harvested according to FIG. 5 are still lying on the ground. Step 604 can be performed entirely manually by the operator of the forwarder 30 or the operator can follow the path plan from step 602 which is shown on the user interface 118, or the forwarder 30 drives automatically along the planned path. In step 606, the arm 40 and grabber 42 are operated to take up one or more logs at one time from the ground, whereby the arm 40 and grabber can be entirely manually controlled or partly or fully automated, for example using a camera 54 and an image processing system on the forwarder 30 or/and different types of sensors. After step 606 or 608, the collected log(s) are deposited in the loading space 44.

Figure 8:
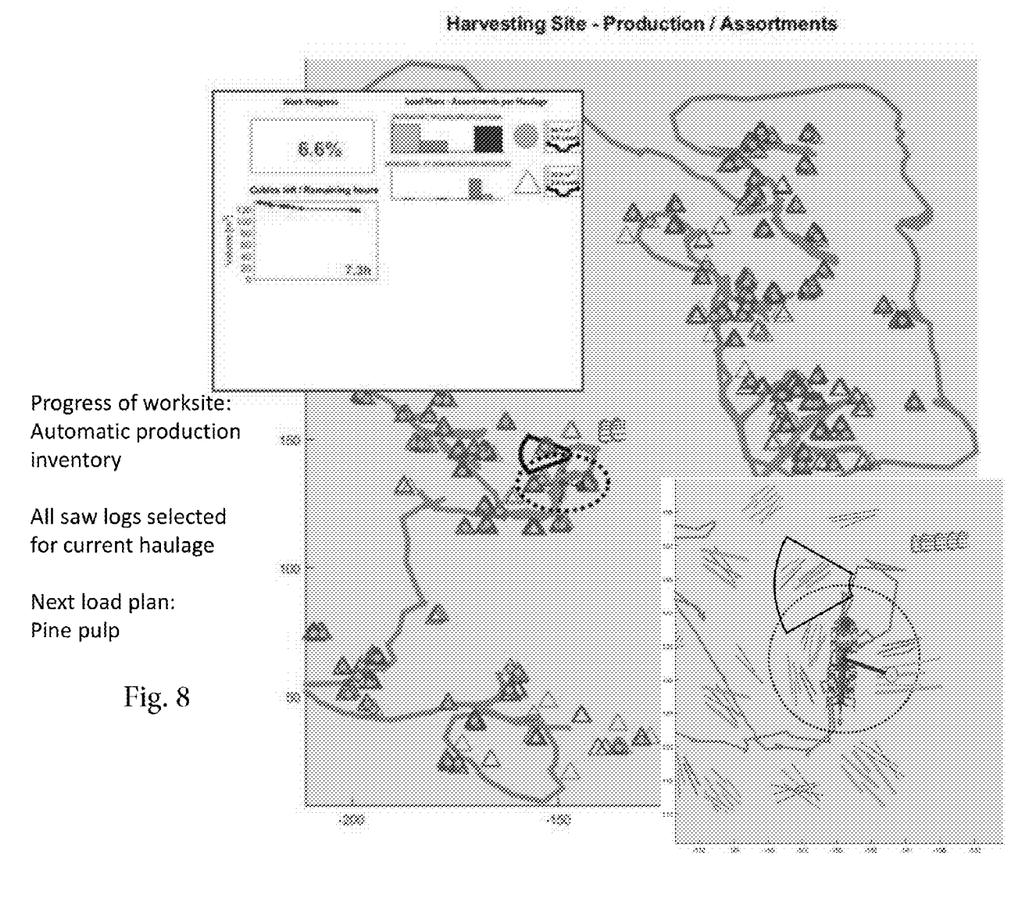
FIG. 8 shows a screen display available to the forwarder operator during collection logs.

In step 608, one or more attributes of the logs taken up in step 606 are detected by a suitable harvested material attribute sensor 124, which is adapted to sense attribute data of the harvested plant material. Such a sensor 124 can be the camera 54, detecting the size of the log(s), the scale 52 detecting their weight, or a reader for a marker 111. A display can be shown to the user as indicated in FIG. 8.

In the next step 610, the sensed attribute(s) is or are compared with the attribute(s) that have been received in step 512. The data processor 114 thus acts as a comparison device adapted to compare the sensed attribute data with the plant attribute data and to generate an output dependent on the result of the comparison.

The comparison in step 610 can check for identity of the attributes, in particular if unambiguous data like numbers or alphanumeric codes are assigned as attribute data to the plant material or logs, or for similarity of the expected and sensed attribute data within a predetermined tolerance frame, in particular if sensed data, like weight and/or length and/or location and/or orientation data are stored and compared. In this case, it would be possible to use a model considering the environmental conditions that prevailed between harvest and collection to encounter for weight loss or shrinking due to evaporation of water from the collected plants. If, for example the accumulated weight of all logs on a worksite is stored in step 506, this accumulated weight is also sensed in step 608 and compared in step 610. On the other hand, all weights or dimensions (length and diameter) of all logs on the worksite can be stored in step 506 and compared in step 610, using a list or table from which collected logs are subsequently cancelled. Such a list or table could be a work site inventory which is automatically updated during the plant material collection and can be used later for inventory control purposes etc.

If the attributes match, step 612 follows, in which the arm 40 and grabber 42 are moved towards the next log(s), followed again by step 606. The successful comparison can also be indicated on user interface 118. On the other hand, if step 610 reveals that the attributes do not match, step 614 follows, in which an error message is given to the operator on the user interface 118, and/or sent to a remote location or server using the wireless communications device 126, in order to inform the forest owner directly or via the server to which he has access. The operator can then take appropriate measures. For example, an attribute indicates a different type (species), size or weight of the log(s), the operator can check whether he has entered the correct worksite. If the number or total weight of logs collected at a particular location is less than expected, the operator can search for missing logs. Once the situation has been cleared, step 612 can follow. At the end of the collection operation, information on the total collected logs and differences between expected (from step 512) and collected plant attributes (from step 608) can be submitted to the forest owner directly or via the server by means of the wireless communications device 126.

It should be mentioned that numerous modifications can be made to the described embodiment. For example, the harvester 10 could be an agricultural harvesting machine, like a baler or a combine, depositing the harvested crop in bales or containers on a field. The forwarder 30 would then be a collecting vehicle, like a tractor, taking up the harvested crop.

Further, the attributes of the logs do not need to be collected during the harvesting process as indicated in step 506, but can be collected before this step or later, for example by a person walking through the forest and collecting manually information about the standing trees or the felled stems or logs. For this purpose, a robot or drone can be used. In this case, the trees can be felled and/or cut into logs manually, not using a harvester 10.

Also, the attributes of the logs do not need to be collected exactly during loading them into the loading space 44 (steps 606, 608), but before this step (for example, using the camera 54 to identify the logs when still lying on the ground) or when they are already in the loading space 44, for example by a RFID reader which is mounted sufficiently close to the loading space 44 to read RFID chips fixed to the logs or hand-held by the forwarder operator. Step 608 can also be performed by a person walking through the forest and collecting manually information about the logs before collection. For this purpose, a robot or drone can be used.

Instead of (or additional to) sending the location and attribute data from the harvester 10 to the forwarder 30 via the wireless communications devices 110, 126, these data can be written into a movable storage device, like a memory card or stick, and physically transferred to the forwarder 39 and be transferred there into the storage device 128. In other embodiments, a data transfer device can include any suitable or future developed system for transferring data, including, but not limited to a wireless communication device (e.g., Bluetooth, local area network (LAN), Wi-Fi, wireless Internet, etc.) a wired communication device (e.g., a serial cable, a Universal Serial Bus (USB) cable, etc.), and/or a physical communication device (e.g., a memory stick, a flash memory card, a USB flash drive, etc.).

Various features and advantages of the disclosure are set forth in the following claims.

The invention claimed is:

1. A method of monitoring the collection of plant material, the method comprising the following steps:
   on a worksite, collecting plant location and attribute data suited for a later identification of the respective plant material, before, during, and/or after harvesting the plant material on the worksite;
   providing the plant location and the attribute data to a collecting vehicle configured to collect the harvested plant material;
   moving the collecting vehicle to the harvested plant material on the worksite, based on the plant location data;
   collecting the harvested plant material in a loading space of the collecting vehicle;
   sensing attribute data of the harvested plant material during the collecting;
   comparing the sensed attribute data with the plant attribute data and generating an output dependent on a result of the comparison; and
   presenting the result of the comparison to an operator of the collecting vehicle via a user interface including displaying an error message if the comparison reveals that the stored plant attribute data and the sensed plant attribute data do not match.

2. The method according to claim 1, wherein the attribute data comprise at least one of a number, a size, a weight, a color, a location, an orientation, a type, one or more ingredients of the plant material, or an identification data of an electronically or optically readable marker, provided during harvesting on the plant material and/or a container thereof.

3. The method according to claim 1, wherein the attribute data concern one plant or a plurality of plants or one part of one plant or more parts of one plant or parts of a plurality of plants.

4. The method according to claim 1, further including wirelessly submitting the result of the comparison to a remote location or server.

5. The method according to claim 1, wherein the plant material is wood or agricultural material.

6. The method according to claim 1, wherein providing the plant location and the attribute data to a collecting vehicle comprises transmitting the plant location and/or the attribute data to the collecting vehicle by a wireless data transmission or a physical data carrier.

7. The method according to claim 1, wherein the plant location and/or attribute data are collected by sensing means provided on a harvesting vehicle and/or on a separate device.

8. The method according to claim 7, wherein the separate device includes one of a robot, a drone, or a device carried by a person.

9. The method according to claim 1, wherein the sensed attribute data are collected by sensing means provided on the collecting vehicle and/or on a separate device.

10. The method according to claim 9, wherein the separate device includes one of a robot, a drone, or a device carried by a person.

11. An arrangement for monitoring the collection of plant material, the arrangement comprising:
a plant data collection assembly configured to collect plant location and attribute data suited for a later identification of the respective plant material before, during, and/or after harvesting the plant material on a worksite;
a data transfer device configured to transfer the plant location and attribute data to a collecting vehicle that is configured to move to the harvested plant material on the worksite based on the plant location data and to collect the harvested plant material in a loading space of the collecting vehicle;
at least one sensor configured to sense attribute data of the harvested plant material during the collecting;
a data processor configured to compare the sensed attribute data with the plant attribute data and to generate an output dependent on a result of the comparison; and
a user interface configured to present the result of the comparison to an operator of the collecting vehicle and to display an error message if the comparison reveals that the stored plant attribute data and the sensed plant attribute data do not match.

12. The arrangement according to claim 11, wherein the attribute data comprise at least one of a number, a size, a weight, a location, an orientation, a color, a type, one or more ingredients of the plant material, or an identification data of an electronically or optically readable marker, provided during harvesting on the plant material and/or a container thereof.

13. The arrangement according to claim 11, comprising:
(a) a user interface on the collecting vehicle configured to present the result of the comparison to an operator of the collecting vehicle, and/or
(b) a wireless communications device for wirelessly submitting the result of the comparison to a remote location or a server.

14. The arrangement according to claim 11, wherein the plant material is wood and the collecting vehicle is a self-propelled forwarder with a loading arm for grabbing one or more logs at a time and a loading space into which the collected logs are deposited.

15. The arrangement according to claim 11, wherein the plant material is agricultural material and the collecting vehicle is a vehicle for collecting the plant material that has been baled or filled in a container by a harvesting machine.

16. The arrangement according to claim 11, wherein the plant location and/or attribute data is configured to be transmitted to the collecting vehicle by a wireless communications device or a physical data carrier.

17. The arrangement according to claim 11, wherein the plant data collection assembly is provided on a harvesting vehicle and/or on a separate device.

18. The arrangement according to claim 17, wherein the separate device includes one of a robot, a drone, or a device carried by a person.

19. The arrangement according to claim 11, wherein the sensor for sensing the attribute is provided on the collecting vehicle and/or on a separate device.

20. The arrangement according to claim 19, wherein the separate device includes one of a robot, a drone, or a device carried by a person.

\* \* \* \* \*